(12) United States Patent
Shangguan et al.

(10) Patent No.: US 12,500,897 B1
(45) Date of Patent: Dec. 16, 2025

(54) APPLICATION ACCESS CONTROL METHOD AND APPARATUS, DEVICE, STORAGE MEDIUM, AND PROGRAM PRODUCT

(71) Applicant: Beijing Volcano Engine Technology Co., Ltd., Beijing (CN)

(72) Inventors: Guanghua Shangguan, Beijing (CN); Pengli Wang, Beijing (CN); Zhongjun Zhang, Singapore (SG); Xiongchun Duan, Beijing (CN)

(73) Assignee: BEIJING VOLCANO ENGINE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 19/075,673

(22) Filed: Mar. 10, 2025

(30) Foreign Application Priority Data

Jun. 17, 2024 (CN) .......................... 202410775375.9

(51) Int. Cl.
*H04L 9/40* (2022.01)
(52) U.S. Cl.
CPC .......... *H04L 63/107* (2013.01); *H04L 63/105* (2013.01)
(58) Field of Classification Search
CPC ............................ H04L 63/107; H04L 63/105
(Continued)

(56) References Cited

U.S. PATENT DOCUMENTS 6,804,777 B2 * 10/2004 Hollis ................. H04L 63/0442
713/153
11,770,334 B2 9/2023 Nainar et al.
(Continued)

FOREIGN PATENT DOCUMENTS

| CN | 114039906 A | 2/2022 |
| CN | 114531263 A | 5/2022 |
| CN | 116389238 A | 7/2023 |
| CN | 116938633 A | 10/2023 |

OTHER PUBLICATIONS

Study on Intelligent Firewall System Combining Intrusion Detection and Egress Access Control, Huang et al., Oct. 2010 (Year: 2010).*

(Continued)

*Primary Examiner* — Jahangir Kabir
(74) *Attorney, Agent, or Firm* — Astute IP Law Group

(57) ABSTRACT

The present disclosure provides an application access control method and apparatus, a device, a storage medium, and a program product. The method includes: obtaining application configuration information, where the application configuration information includes preset application information, and preset access identifications and egress gateway information corresponding to the preset application information; obtaining, in response to a connection request from a client of a security management application, a target access identification of the client; querying, based on the target access identification, corresponding target application information and target egress gateway information corresponding to the target application information from the application configuration information; and feeding the target application information and the target egress gateway information back to the client, to cause the client to perform access control on a first business application on a target terminal device based on the target application information and the target egress gateway information.

18 Claims, 8 Drawing Sheets

(58) Field of Classification Search
USPC .......................................................... 726/27
See application file for complete search history.

(56) References Cited

U.S. PATENT DOCUMENTS

| | | | |
|---|---|---|---|
| 2015/0281282 A1* | 10/2015 | Medappa | H04L 63/0263 |
| | | | 726/1 |
| 2021/0168125 A1* | 6/2021 | Vemulpali | H04L 9/3236 |
| 2021/0344608 A1 | 11/2021 | Zeng et al. | |
| 2022/0400136 A1 | 12/2022 | Kojima et al. | |
| 2024/0022499 A1 | 1/2024 | Sinha et al. | |
| 2024/0073781 A1* | 2/2024 | Srinivas | H04W 12/35 |
| 2025/0141926 A1* | 5/2025 | Jain | H04L 63/105 |

OTHER PUBLICATIONS

Office Action received for Chinese Patent Application No. 202410775375.9, mailed on Jul. 27, 2024, 12 pages.
Notice to Grant Patent Right for Invention for Chinese Patent Application No. 202410775375.9, mailed on Mar. 3, 2025, 5 page.
Extended European search report received for European Patent Application No. 25161637.1, mailed on Jul. 4, 2025, 10 pages.

* cited by examiner

APPLICATION ACCESS CONTROL METHOD AND APPARATUS, DEVICE, STORAGE MEDIUM, AND PROGRAM PRODUCT

CROSS-REFERENCE TO RELATED APPLICATION(S)

This application claims priority to Chinese Application No. 202410775375.9 filed on Jun. 17, 2024, the disclosure of which is incorporated herein by reference in its entirety.

FIELD

The present disclosure relates to the technical field of network communications, and in particular, to an application access control method and apparatus, a device, a storage medium, and a program product.

BACKGROUND

Software defined networking in a wide area network (SD-WAN), as a virtual wide area network architecture, supports hosting of business applications within an on-premises internal Internet data center, a public cloud or a private cloud, as well as software as a service (SaaS), and can provide high-level application performance.

In practical application scenarios, if an enterprise has branch offices established in different regions, the enterprise can deploy customer premises equipment (CPE) for accessing the SD-WAN in regions where the branch offices are located, and terminal devices in the branch offices access the SD-WAN through the customer premises equipment in their respective regions to form a branch network. Through a software service mode provided by the SD-WAN, the enterprise can connect the business application on the terminal device to the service end of the business application to obtain required application resources.

SUMMARY

The present disclosure provides an application access control method and apparatus, a device, a storage medium, and a program product.

According to a first aspect, the present disclosure provides an application access control method, where the method is applied to software defined networking in a wide area network. The method includes:
  obtaining application configuration information, where the application configuration information comprises a plurality of pieces of preset application information, and preset access identifications and egress gateway information corresponding to the pieces of preset application information;
  obtaining, in response to a connection request from a client of a security management application, a target access identification of the client;
  querying, based on the target access identification, corresponding target application information and target egress gateway information corresponding to the target application information from the application configuration information; and
  feeding the target application information and the target egress gateway information back to the client, to cause the client to perform access control on a first business application on a target terminal device based on the target application information and the target egress gateway information, where the target terminal device is a terminal device where the client is located, and the first business application corresponds to the target application information.

According to a second aspect, the present disclosure provides an application access control apparatus, where the apparatus is applied to software defined networking in a wide area network. The apparatus includes:
  a configuration information obtaining module configured to obtain application configuration information, where the application configuration information comprises a plurality of pieces of preset application information, and preset access identifications and egress gateway information corresponding to the pieces of preset application information;
  an access identification obtaining module configured to obtain, in response to a connection request from a client of a security management application, a target access identification of the client;
  a configuration information query module configured to query, based on the target access identification, corresponding target application information and target egress gateway information corresponding to the target application information from the application configuration information; and
  an application access control module configured to feed the target application information and the target egress gateway information back to the client, to cause the client to perform access control on a first business application on a target terminal device based on the target application information and the target egress gateway information, where the target terminal device is a terminal device where the client is located, and the first business application corresponds to the target application information.

According to a third aspect, the present disclosure provides a computer device, including: a memory and a processor communicatively connected to each other, where the memory stores computer instructions, and the processor executes the computer instructions to perform the application access control method according to the first aspect or any of the corresponding implementations thereof.

According to a fourth aspect, the present disclosure provides a computer-readable storage medium, where the medium stores computer instructions, and the computer instructions are configured to cause a computer to perform the application access control method according to the first aspect or any of the corresponding implementations thereof.

According to a fifth aspect, the present disclosure provides a computer program product including computer instructions, where the computer instructions are configured to cause a computer to perform the application access control method according to the first aspect or any of the corresponding implementations thereof.

BRIEF DESCRIPTION OF THE DRAWINGS

To more clearly describe the technical solutions in specific implementations of the present disclosure or in the prior art, the accompanying drawings for describing the specific implementations or the prior art will be briefly described below. Apparently, the accompanying drawings in the description below show some implementations of the present disclosure, and those of ordinary skill in the art may still derive other accompanying drawings from these accompanying drawings without creative efforts.

DETAILED DESCRIPTION OF EMBODIMENTS

Figure 1:
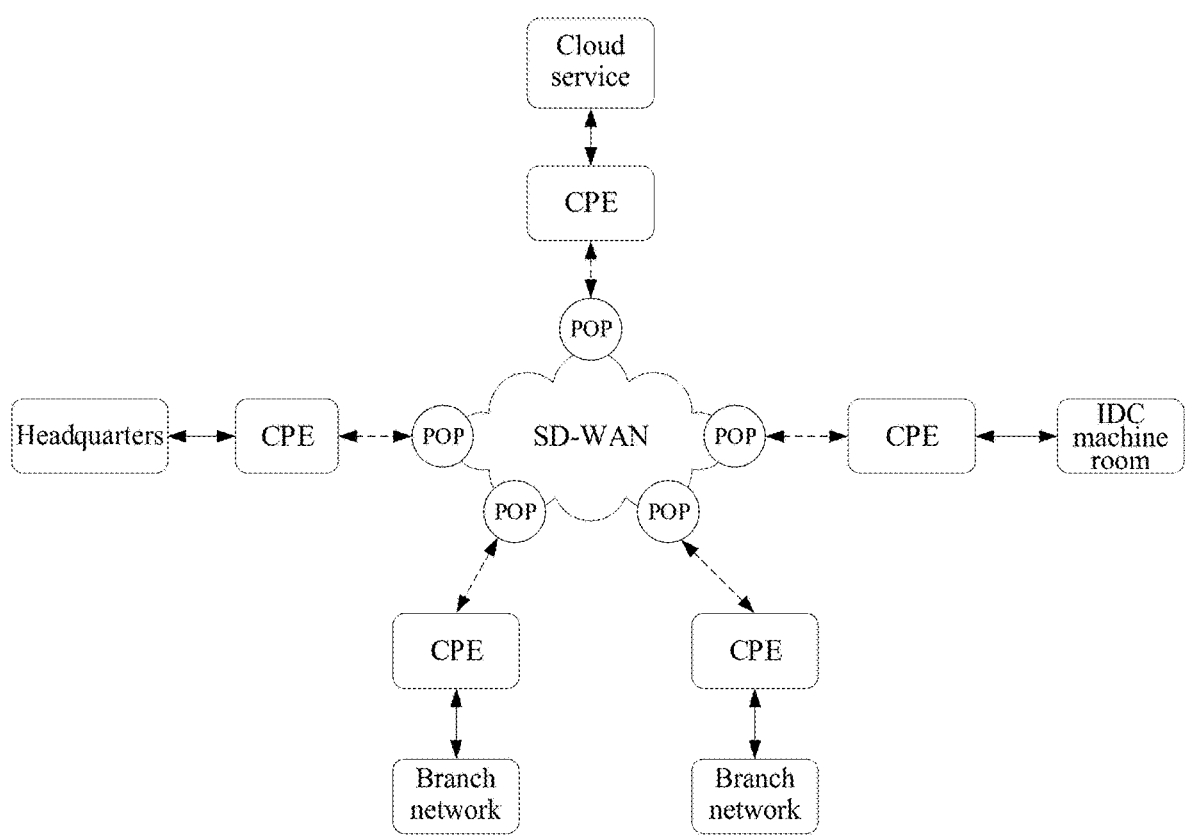
FIG. 1 is a schematic diagram of an SD-WAN-based network architecture according to embodiments of the present disclosure.

The embodiments of the present disclosure are described in more detail below with reference to the accompanying drawings. Although some embodiments of the present disclosure are shown in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and the embodiments of the present disclosure are only for exemplary purposes, and are not intended to limit the scope of protection of the present disclosure.

In the description of the embodiments of the present disclosure, the term "include" and similar terms should be understood as open-ended inclusion, namely. "including but not limited to". The term "based on" should be understood as "at least partially based on". The term "an embodiment" or "the embodiment" should be understood as "at least one embodiment". The term "some embodiments" should be understood as "at least some embodiments". Other explicit and implicit definitions may be included below.

Herein, unless explicitly stated, performing a step "in response to A" does not mean that the step is performed immediately after "A", but may include one or more intermediate steps.

It should be understood that the data involved in the technical solutions (including, but not limited to, the data itself, and the access to, use, storage, or deletion of the data) should comply with the requirements of corresponding laws, regulations, and relevant provisions.

It can be understood that before the use of the technical solutions disclosed in the embodiments of the present disclosure, the user shall be informed of the type, range of use, use scenarios, etc. of information involved in the present disclosure in an appropriate manner in accordance with the relevant laws and regulations, and the authorization shall be obtained from the relevant users. The relevant users may include any type of subjects of right, such as individuals, enterprises, and groups.

For example, in response to receiving an active request from a user, prompt information is sent to the relevant user to clearly inform the relevant user that an operation requested to be performed will require access to and use of the information of the relevant user. In this way, the relevant user can autonomously choose, based on the prompt information, whether to provide the information to software or hardware, such as an electronic device, an application, a server, or a storage medium, that performs the operations of the technical solutions of the present disclosure.

As an optional but non-limiting implementation, in response to receiving the active request from the relevant user, the prompt information may be sent to the relevant user in the form of, for example, a pop-up window, in which the prompt information may be presented in text. Further, the pop-up window may also carry a selection control for the user to choose whether to "agree" or "disagree" to provide the information to the electronic device.

It can be understood that the above process of notifying and obtaining user authorization is only illustrative and does not constitute a limitation on the implementations of the present disclosure, and other manners that satisfy the relevant laws and regulations may also be applied in the implementations of the present disclosure.

Office security typically involves security management of networks, identities, and terminals. By implementing networking of a dedicated network, access control, management of terminals within the dedicated network, and information security protection, digital office operations can be made more secure, more efficient, and more user-friendly. The security management at the network level can ensure that dedicated networks, such as office networks, can operate securely and efficiently, thereby ensuring the secure transmission and storage of business data. The security management at the identity level can enhance the efficiency and security of identity authentication for users when accessing dedicated networks. The security management at the terminal level can implement unified management of terminal devices within dedicated networks, data leak prevention, and terminal threat protection, thereby ensuring the security of enterprise data.

During practical application, the security management of networks, identities, and terminals can achieve technical correlations across a plurality of technical branches, such as networking strategies, network access and control, remote access, unified terminal management, terminal detection and response, enterprise data leakage prevention, and identity authentication management, thereby making digital office simpler, more efficient, and easier to implement.

Software defined networking in a wide area network (SD-WAN), as a virtual wide area network architecture, supports hosting of business applications within an on-premises internal Internet data center, a public cloud or a private cloud, as well as software as a service (SaaS), and can provide high-level application performance.

In practical application scenarios, if an enterprise has branch offices established in different regions, the enterprise can deploy customer premises equipment (CPE) for accessing the SD-WAN in regions where the branch offices are located, and terminal devices in the branch offices access the SD-WAN through the customer premises equipment in their respective regions to form a branch network. Through a software service mode provided by the SD-WAN, the enterprise can connect the business application on the terminal device to the service end of the business application to obtain required application resources.

In the related art, it is typically necessary to install security management applications in on-premises terminal devices. Through the security management applications, control access is implemented for business applications on the terminal devices, thereby ensuring the security of business application resources. When a client of the security management application detects that a business application needs to access its corresponding service end, the client of the security management application will resolve the domain name of the business application on a local domain name system (DNS) server to obtain a corresponding Internet protocol (IP) address. Based on the resolved IP address, a pre-configured routing configuration strategy (e.g., for directing traffic from a region A to a region B), and an intelligent route-selection algorithm, an SD-WAN controller selects an optimal path to access the service end corresponding to the IP address. Moreover, the SD-WAN controller generates a corresponding flow table based on the selected path and delivers the flow table to points of presence (POP) to guide the transmission of the access traffic of the business application along the selected path.

However, due to a limited number of routing configuration strategies and coarse-grained routing control and management in the SD-WAN, it is difficult to cover all possible traffic scheduling scenarios. As a result, when the business application on each on-premises terminal device and the service end of the business application are located in different regions, the access traffic of the business application may be erroneously scheduled to other regions and then detoured from these other regions back to the region where the service end is located, resulting in a relatively long access latency for the business application on the terminal device during cross-region access to application resources based on an SD-WAN network. For example, the terminal device is located in the region A. and the service end of the business application to be accessed is located in a region C. Assuming that the current routing configuration strategy needs to direct all traffic of the region A to the region B, then if the business application on the terminal device needs to access the service end in the region C, the traffic needs to be first sent to the region B before an attempt is made to access the service end in the region C.

In addition, even when the terminal device and the service end to be accessed are deployed in the same region, the access traffic of the business application may be erroneously scheduled to other regions and then detoured from these other regions back to the region where the service end is located, resulting in a relatively long access latency for the business application on the terminal device during access to the application resources. For example, the terminal device and the service end of the business application to be accessed are both located in the region A. Assuming that the current routing configuration strategy needs to direct all the traffic of the region A to the region B, then if the business application on the terminal device needs to access the service end of the business application, the traffic needs to be first sent to the region B. and then detoured from the region B back to the service end in the region A.

In summary: due to the limited number of routing configuration strategies and the coarse-grained routing control and management in the current SD-WAN, access latency is relatively long during cross-region access to the application resources based on the SD-WAN network.

In view of this, the present disclosure provides an application access control method and apparatus, a device, a storage medium, and a program product, to solve the problem of a relatively long access latency during cross-region access to application resources based on an SD-WAN network. According to the embodiments of the present disclosure, application access control method embodiments are provided. In the application access control method according to the embodiments of the present disclosure, the plurality of preset application information, and the preset access identifications and the egress gateway information corresponding to the preset application information are pre-configured. Upon reception of the connection request from the client of the security management application, the corresponding target application information and target egress gateway information are queried from the plurality of preset application information and the egress gateway information based on the target access identification of the client. Then, the queried information is fed back to the client, such that the client performs access control on the first business application on the target terminal device based on the target application information and the target egress gateway information. Therefore, based on different access identifications and the first business application to be accessed, the access traffic of the first business application can be scheduled to an egress gateway corresponding to a service end of the first business application, which prevents the access traffic of the first business application from being erroneously scheduled to other regions, and thus reducing the access latency during cross-region access to application resources based on the SD-WAN network.

It should be noted that steps shown in flowcharts of the accompanying drawings may be performed, for example, in a computer system including a group of computer-executable instructions. Although a logical sequence is shown in the flowcharts, the steps shown or described may be performed in a sequence different from that shown herein in some cases.

The software defined networking in a wide area network (hereinafter referred to as SD-WAN)-based network architecture used in these embodiments of the present disclosure mainly includes: a client of a security management application targeting internal members of an enterprise, customer premises equipment (hereinafter referred to as CPE) of the SD-WAN, points of presence (hereinafter referred to as POP), and a control plane.

Referring to the content shown in FIG. 1, the use of the components in the network architecture according to the present disclosure is as follows.

(1) The client of the security management application is deployed on each terminal device within an enterprise intranet. Through the client of the security management application, access control may be performed on a business application on the terminal device where the client is located, such as a SaaS application, and a business application hosted in the Internet data center, the public cloud, or the private cloud.

(2) The CPEs are deployed at enterprise headquarters, a branch network, the Internet data center (IDC machine room), a cloud service (e.g., the public cloud and the private cloud), etc. The CPE, as a branch gateway, connects with a client on the branch network, and is configured to aggregate all proxy traffic (e.g., client traffic) on the branch network.

(3) The POP connects with a physically proximate CPE, and POP is configured to forward the traffic aggregated by the CPE.

(4) The control plane is used to configure application information, such as an application name and an application address (e.g., an application domain name) of a business application that requires cross-region access or scheduling. In addition, the control plane is further used to configure a route-selection strategy corresponding to each application, such as an access identification corresponding to each application, and CPE information as an egress gateway, where the egress gateway is geographically close to a service end of the application. The control plane delivers configured content to the POP, and the POP delivers, based on an access identification of a connected client of the security management application, to the client the application information on which the client of the security management application needs to perform access control, and its corresponding route-selection strategy.

Figures 2, 3:
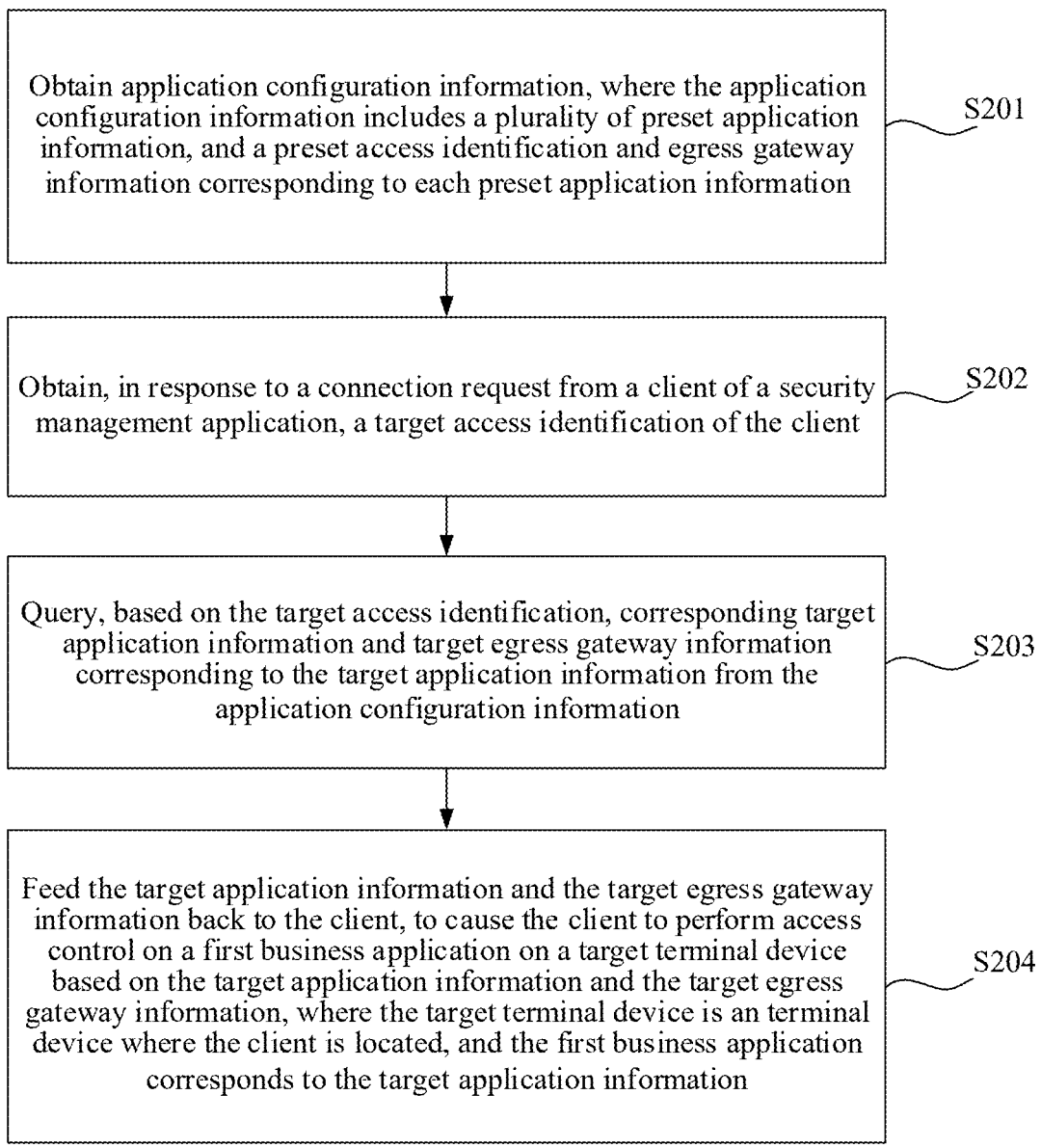
FIG. 2 is a schematic flowchart of an application access control method according to embodiments of the present disclosure.
FIG. 3 is a schematic diagram of a configuration page of application information according to embodiments of the present disclosure.

In these embodiments, an application access control method is provided, which may be used in the above SD-WAN, such as the POP in the SD-WAN. FIG. 2 is a schematic flowchart of an application access control method according to embodiments of the present disclosure. As shown in FIG. 2, the process includes the following steps.

Step S201: application configuration information is obtained. The application configuration information comprises a plurality of pieces of preset application information, and preset access identifications and egress gateway information corresponding to the pieces of preset application information.

Specifically, the preset application information includes application names and application addresses. The application addresses are IP addresses or domain names. In addition, the preset application information further includes application tags for classified management of configured applications. The preset access identifications include identifications of a plurality of categories. For example, the preset access identifications for the same user include a user identification, a department identification, and a role identification. The egress gateway information is used by a client of a security management application to determine, as an egress gateway, a CPE that is geographically closer to a service end of a business application corresponding to the preset application information. For example, if the service end of the business application corresponding to the preset application information is deployed in a region A, a CPE deployed in the region A within the SD-WAN may serve as the egress gateway.

Exemplarily, as shown in FIG. 3, an administrator configures corresponding application information on a control plane, such as configuring Application as an application name of a business application that requires scheduling, and configuring A.com as an application address of Application, with no application tag configured, thereby obtaining the preset application information. After the application information has been configured, as shown in FIG. 4, the administrator configures corresponding application configuration information on the control plane, such as configuring test1 as the egress gateway information for the business application and ID1 as the preset access identification, thereby obtaining the application configuration information.

Figures 4, 5:
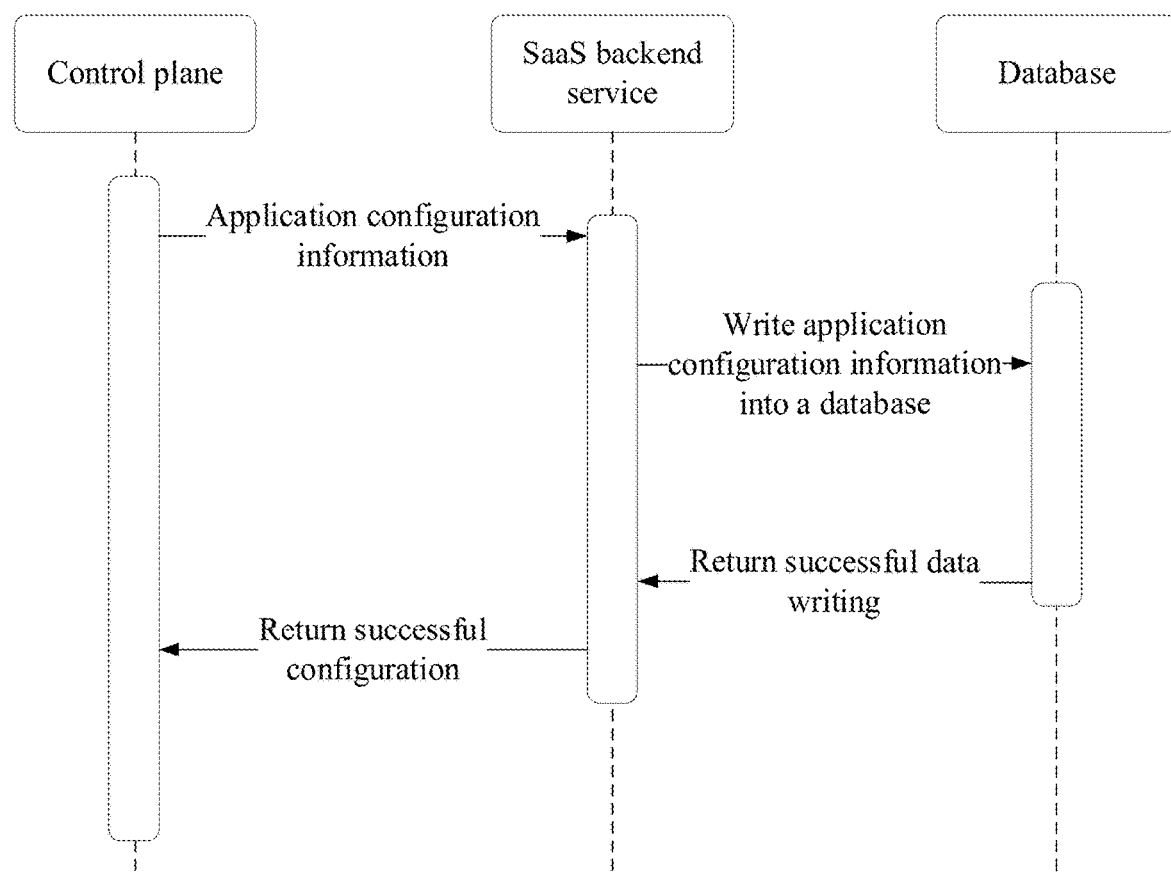
FIG. 4 is a schematic diagram of a configuration page of application configuration information according to embodiments of the present disclosure.
FIG. 5 is a schematic diagram of a configuration process of application configuration information according to embodiments of the present disclosure.

Further, as shown in FIG. 5, the control plane of the SD-WAN sends the configured application configuration information to a backend service of software as a service (Saas), and the SaaS backend service then writes the application configuration information into a pre-constructed database. After the application configuration information has been successfully written, the database feeds information indicating successful data writing back to the SaaS backend service to inform the SaaS backend service that the data writing has been completed. Upon receiving the information indicating successful data writing, the SaaS backend service feeds information indicating successful configuration back to the control plane to inform the control plane that the application configuration has been completed.

Figure 6:
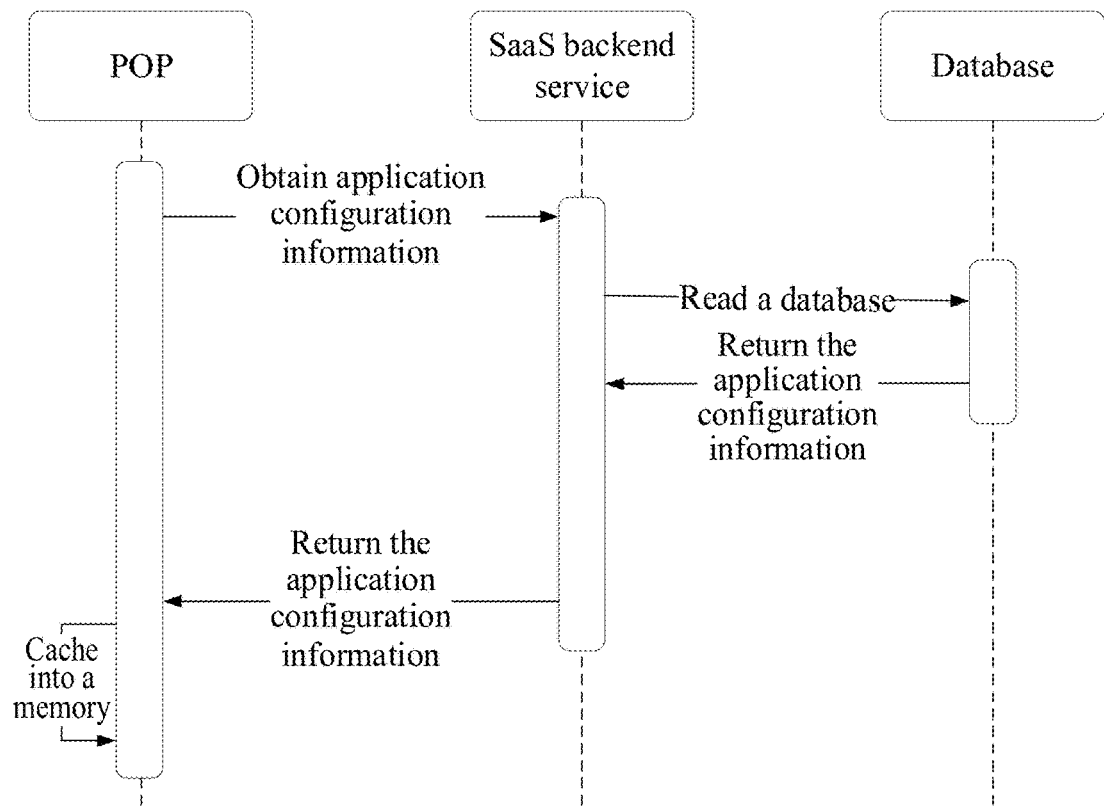
FIG. 6 is a schematic diagram of a process of a point of presence obtaining application configuration information according to embodiments of the present disclosure.

Further, as shown in FIG. 6, the POP sends an information obtaining request to the SaaS backend service through a timed task to obtain the application configuration information. Upon receiving the information obtaining request from the POP, the SaaS backend service reads the database, obtains the application configuration information from the database, and feeds the obtained application configuration information back to the POP. The POP caches the application configuration information in a memory.

Step S202: in response to a connection request from a client of a security management application, a target access identification of the client is obtained.

Specifically, the POP may parse the connection request from the client of the security management application to obtain the target access identification of the client of the security management application. Alternatively, the POP forwards the connection request to a third-party authentication platform, such as the SaaS backend service, and then the third-party authentication platform performs permission verification on the connection request and parses the connection request to obtain the target access identification of the client of the security management application.

Step S203: based on the target access identification, corresponding target application information and target egress gateway information corresponding to the target application information are queried from the application configuration information.

Figure 7:
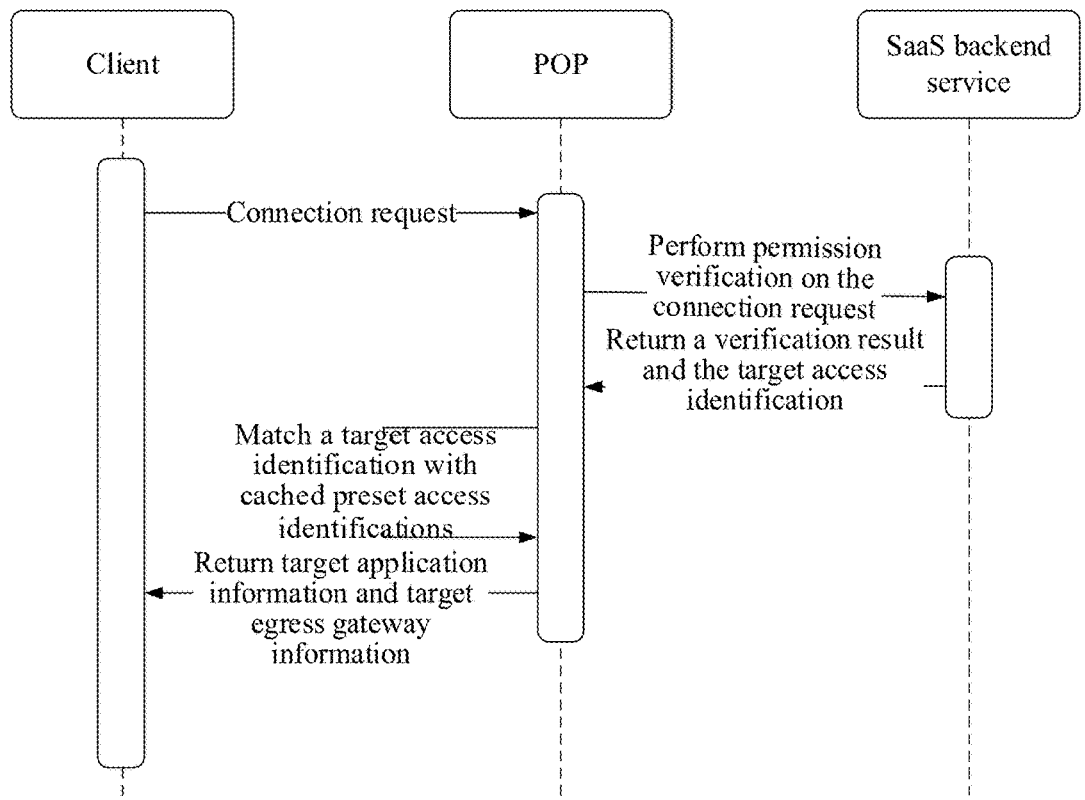
FIG. 7 is a schematic diagram of interaction in response to a connection request from a client according to embodiments of the present disclosure.

Specifically, as shown in FIG. 7, the target access identification is matched with cached preset access identifications, and preset application information corresponding to a matching preset access identification is used as the target application information. Moreover, egress gateway information corresponding to the matching preset access identification is used as the target egress gateway information.

Step S204: the target application information and the target egress gateway information are fed back to the client, to cause the client to perform access control on a first business application on a target terminal device based on the target application information and the target egress gateway information, where the target terminal device is a terminal device where the client is located, and the first business application corresponds to the target application information.

Specifically, after the target application information and the target egress gateway information are fed back to the client of the security management application, if the client of the security management application detects that the business application on the terminal device that corresponds to the target application information needs to access the corresponding service end to obtain required application resources, access traffic (e.g., a domain name resolution request or a data request packet) of the business application corresponding to the target application information can be forwarded based on the target egress gateway information to a target egress gateway corresponding to the target egress gateway information. This allows the target egress gateway to be used to access the service end corresponding to the target application information, thereby obtaining the required application resources.

In the application access control method according to this embodiment, the plurality of pieces of preset application information, and the preset access identifications and the egress gateway information corresponding to the pieces of preset application information are pre-configured. Upon reception of the connection request from the client of the security management application, the corresponding target application information and target egress gateway information are queried from the plurality of pieces of preset application information and the egress gateway information based on the target access identification of the client. Then, the queried information is fed back to the client, such that the client performs access control on the first business application on the target terminal device based on the target application information and the target egress gateway information. Therefore, based on different access identifications and the first business application to be accessed, the access traffic of the first business application can be scheduled to an egress gateway corresponding to a service end of the first business application, which prevents the access traffic of the first business application from being erroneously scheduled to other regions, and thus reducing the access latency during cross-region access to application resources based on the SD-WAN network.

In some optional implementations, the above step S202 of obtaining, in response to the connection request from a client, a target access identification of the client includes the following steps.

Step a1: in response to the connection request from the client, the connection request is sent to the third-party authentication platform, to cause the third-party authentication platform to perform permission verification on the connection request; and Step a2: in response to the permission verification by the third-party authentication platform being successful, the target access identification fed back by the third-party authentication platform is received.

Specifically, the third-party authentication platform is the SaaS backend service. As shown in FIG. 7, in response to the connection request from the client of the security management application, the POP feeds the connection request back to the SaaS backend service, and the SaaS backend service performs the permission verification, such as identity verification, access permission verification, or dynamic control verification, on the connection request. After the permission verification on the connection request is successful, the SaaS backend service feeds a verification result and the target access identification corresponding to the connection request back to the POP.

Further, if the permission verification by the third-party authentication platform fails, no processing is performed on the received connection request.

In the application access control method according to this embodiment, the connection request is sent to the third-party authentication platform for permission verification, and after the permission verification, the target access identification fed back by the third-party authentication platform is received. Therefore, data security can be ensured, and data leakage is avoided.

In some optional implementations, the application configuration information further includes priorities of the egress gateway information corresponding to the pieces of preset application information. Therefore, the above step S203 of querying, based on the target access identification, corresponding target application information and target egress gateway information corresponding to the target application information from the application configuration information includes the following steps.

Step b1: based on the target access identification, the corresponding target application information and a first gateway information set corresponding to the target application information are queried from the application configuration information.

Step b2: based on egress gateway information with the highest priority in the first gateway information set, the target egress gateway information adapted to the target application information is determined.

It should be noted that the priority of the egress gateway information can be determined based on a communication distance between the egress gateway corresponding to the egress gateway information and the service end corresponding to the target application information. A closer communication distance indicates a higher priority of the egress gateway information. In addition, the priority of the egress gateway information can also be determined based on the data transmission quality; bandwidth, transmission latency, etc. of the egress gateway corresponding to the egress gateway information. For example, a higher data transmission quality indicates a higher priority of the egress gateway information. The method for determining the priority of the egress gateway information is not limited herein.

Exemplarily, as shown in Table 1, assuming that the preset access identification is ID1, the preset application information corresponding to ID1 is A.com, and the egress gateway information includes test1 and test2, with test1 having a priority of 99 and test2 having a priority of 98. If the target access identification is ID1, the target application information is A.com, and the first gateway information set includes test1 and test2. Since test1 has a higher priority than test2, test1 is the target egress gateway information.

TABLE 1

| Application configuration information | | | |
| --- | --- | --- | --- |
| Preset access identifications | Preset application information | Egress gateway information | Priority |
| ID1 | A.com | test1 | 99 |
| ID1 | A.com | test2 | 98 |

In the application access control method according to this embodiment, the egress gateway information with the highest priority is determined as the target egress gateway information adapted to the target application information. Therefore, when conditions permit, data can be transmitted through the egress gateway with better network performance, which avoids network congestion and further reduces access latency:

It should be noted that in a case where there is a single piece of egress gateway information in the first gateway information set, the egress gateway information in the first gateway information set can be directly determined as the target egress gateway information.

In some optional implementations, the preset access identifications and the target access identification each include identifications of a plurality of categories, such as a user identification, a department identification, and a role identification. Therefore, the above step b1 of querying, based on the target access identification, the corresponding target application information and a first gateway information set corresponding to the target application information from the application configuration information includes the following steps.

Step b11: a first access identification and a second access identification that match each other are determined from the preset access identifications and the target access identification. The first access identification belongs to the preset access identifications, and the second access identification belongs to the target access identification.

Step b12: preset application information corresponding to the first access identification is determined as target application information adapted to the second access identification.

Step b13: based on egress gateway information corresponding to the first access identification, the first gateway information set adapted to the target application information is determined.

Specifically, when obtaining the application configuration information, the POP can respectively cache, by category; the preset application information and the egress gateway information corresponding to an identification of each category in the preset access identification. For example, if the preset access identification includes an identification of a first category, an identification of a second category, and an identification of a third category, data corresponding to the identification of the first category, the identification of the second category, and the identification of the third category can be respectively cached. Therefore, multiple matching queries are performed based on identifications of different categories in the target access identification.

Exemplarily, the identification of the first category being an employee identification, the identification of the second category being a department identification, and the identification of the third category being a role identification is used as example. As shown in Table 2, assuming that the employee identification includes ID11, the preset application information corresponding to ID11 includes A.com and B.com, and the egress gateway information corresponding to A.com and B.com includes test1. As shown in Table 3, assuming that the department identification includes ID21 and ID22, the preset application information corresponding to ID21 includes A.com and B.com, and the egress gateway information corresponding to A.com and B.com includes test1; and the preset application information corresponding to ID22 includes C.com, and the egress gateway information corresponding to C.com includes test2. As shown in Table 4, assuming that the role identification includes ID31, the preset application information corresponding to ID31 includes A.com and B.com, and C.com, and the egress gateway information corresponding to A.com and B.com, and C.com includes test1 and test2.

If a target access identification for a user includes ID11, ID21 and ID22, and ID31, as shown in Table 5, the target application information includes A.com, B.com, and C.com, and the first gateway information set includes test1 and test2.

TABLE 2

Employee identification data

| Employee identification | Preset application information | Egress gateway information |
|---|---|---|
| ID11 | A.com and B.com | test1 |

TABLE 3

Department identification data

| Department identification | Preset application information | Egress gateway information |
|---|---|---|
| ID21 | A.com and B.com | test1 |
| ID22 | C.com | test2 |

TABLE 4

Data of role identification

| Role identification | Preset application information | Egress gateway information |
|---|---|---|
| ID31 | A.com, B.com, and C.com | test1 and test2 |

TABLE 5

Data of target access identification

| Employee identification | Department identification | Role identification | Target application information | First gateway information set |
|---|---|---|---|---|
| ID11 | ID21 and ID22 | ID31 | A.com, B.com, and C.com | test1 and test2 |

In the application access control method according to this embodiment, if the preset access identifications and the target access identification include the identifications of the plurality of categories, the matching first access identification and second access identification are first determined from the preset access identifications and the target access identification. Then, the preset application information corresponding to the first access identification is determined as the target application information adapted to the second access identification. Moreover, the egress gateway information corresponding to the first access identification is determined as the first gateway information set adapted to the target application information. Therefore, the data query efficiency and the data query completeness can be effectively improved.

In some optional implementations, in a case where there are a plurality of pieces of egress gateway information with the highest priority, the above step b2 of determining, based on egress gateway information with the highest priority in the first gateway information set, the target egress gateway information adapted to the target application information includes the following steps.

Step b21: a second gateway information set is obtained based on the egress gateway information with the highest priority in the first gateway information set.

Step b22: configuration times of the pieces of egress gateway information in the second gateway information set are obtained.

Step b23: egress gateway information with a most recent configuration time in the second gateway information set is determined as the target egress gateway information.

It should be understood that the network performance of the egress gateway may be affected by various factors. For example, due to congestion in a network connected to the egress gateway or degradation of the performance of network equipment, the network performance of the egress gateway may also be affected. Therefore, to ensure stability and security of the network performance of the egress gateway, the egress gateway information may be updated based on the network performance of the egress gateway, etc. during a practical configuration process. Based on this, under the same priority, the egress gateway information with the most recent configuration time is selected as the target egress gateway information for the target application information based on the configuration times of the pieces of egress gateway information. In this way; the configured target egress gateway information is made closer to the current network condition, thereby further reducing a network latency.

In the application access control method according to this embodiment, the egress gateway information with the most recent configuration time among the pieces of egress gateway information with the highest priority is determined as the target egress gateway information. Therefore, when conditions permit, data can be transmitted through the egress gateway with better network performance, which further reduces access latency.

It should be noted that in a case where there is a single piece of egress gateway information with the highest priority: the egress gateway information with the highest priority can be directly determined as the target egress gateway information.

In some optional implementations, the above step S204 of feeding the target application information and the target egress gateway information back to the client includes the following steps.

Step c1: hash mapping on the target application information is performed to obtain target mapping data. The target mapping data is used to represent existence of the target application information.

Step c2: the target mapping data and the target egress gateway information are fed back to the client.

Specifically, the target application information includes an application address of a target application, such as a domain name corresponding to the target application. The target mapping data may be a hash table or a Bloom filter. The target mapping data being the Bloom filter is used as an example. Hash mapping is performed on the application address through a preset hash function, to map the application address to a pre-constructed array to obtain the Bloom filter. When there is a need to query whether an application address to be accessed exists in the target application information, hash mapping may be performed on the application address to be accessed through the preset hash function, to determine, based on a hash mapping result, whether the application address to be accessed exists in the target application information.

In the application access control method according to this embodiment, hash mapping is performed on the target application information to obtain the target mapping data. The target mapping data representing the existence of the target application information is fed back to the client. Therefore, there is no need to send actual data of the target application information to the client, thereby ensuring the data security. In addition, the data query efficiency can be improved when there is a large data volume of the target application information.

Figure 8:
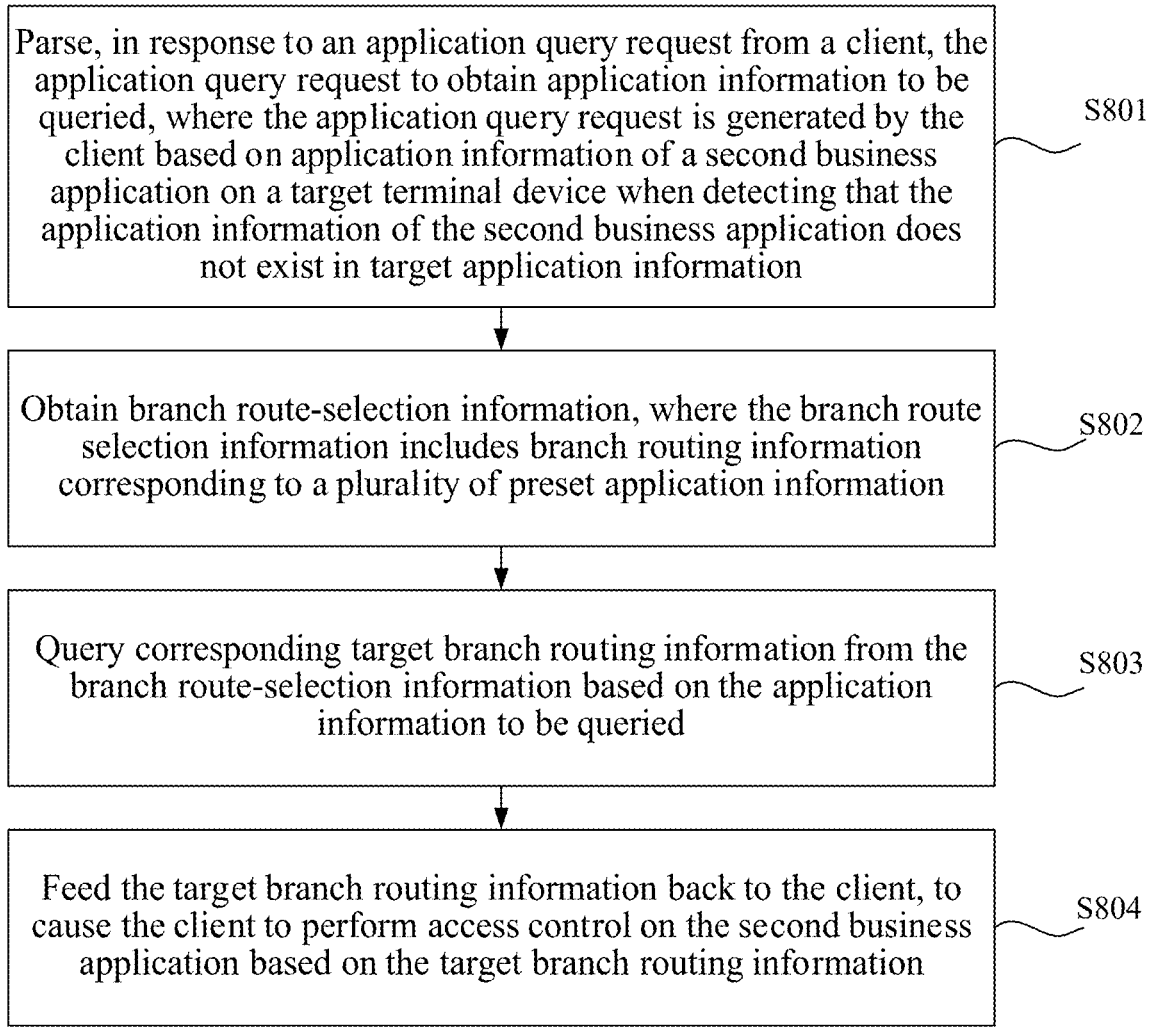
FIG. 8 is a schematic flowchart of another application access control method according to embodiments of the present disclosure.

In some optional implementations, as shown in FIG. 8, the application access control method according to the present disclosure further includes the following steps.

Step S801: in response to an application query request from the client, the application query request is parsed to obtain application information to be queried. The application query request is generated by the client based on application information of a second business application on the target terminal device in response to detecting that the application information of the second business application does not exist in the target application information.

Step S802: branch route-selection information is obtained, where the branch route-selection information includes branch routing information corresponding to the plurality of pieces of preset application information.

Step S803: corresponding target branch routing information is queried from the branch route-selection information based on the application information to be queried.

Step S804: the target branch routing information is fed back to the client, to cause the client to perform access control on the second business application based on the target branch routing information.

Specifically, the branch routing information includes the egress gateway information corresponding to the preset application information, which is used to schedule access traffic corresponding to the preset application information to the egress gateway corresponding to the egress gateway information.

Further, the branch routing information further includes ingress gateway information, which is used to schedule the access traffic corresponding to the preset application information from an ingress gateway corresponding to the ingress gateway information to the egress gateway corresponding to the egress gateway information. The ingress gateway is a CPE in a region where a data requester is located.

It should be noted that, considering that in practical situations, if there is a large data volume of the preset application information, it is difficult to configure all application access situations based on the access identifications. Therefore, when the client of the security management application detects the access traffic of the second business application on the terminal device, if the application information of the second business application does not exist in the target application information delivered by the POP, the access traffic of the second business application can be scheduled to a service end corresponding to the second business application through other pre-configured branch routing information, thereby ensuring the reliability of application access business.

In the application access control method according to this embodiment, when detecting that the application information of the second business application on the terminal device does not exist in the target application information, the client of the security management application generates the application query request. The POP queries the corresponding target branch routing information from the branch route-selection information based on the application information to be queried (i.e., the application information of the second business application) that is carried in the application query request. This allows the client of the security management application to perform access control on the second business application based on the target branch routing information. Therefore, the reliability of the application access business can be ensured.

In some optional implementations, the branch route-selection information further includes a priority of each piece of branch routing information. The above step S803 of querying corresponding target branch routing information from the branch route selection information based on the application information to be queried includes the following steps.

Step d1: a corresponding branch routing information set is queried from the branch route-selection information based on the application information to be queried.

Step d2: the branch routing information with the highest priority in the branch routing information set is determined as the target branch routing information.

It should be noted that if there is a single piece of branch routing information in the branch routing information set, the branch routing information in the branch routing information set can be directly determined as the target branch routing information.

In some optional implementations, the SD-WAN-based network architecture used in the present disclosure further includes a central domain name system (DNS). The control plane delivers the configured application configuration information to the central domain name system. The central domain name system is connected to the client of the security management application and the CPE, and is configured to forward a domain name resolution request for the business application on the terminal device where the client of the security management application is located to the corresponding egress gateway, and then resolve the request to obtain a network address of a service end corresponding to the business application.

Specifically: the target application information includes an application address of the first business application, where the application address is a domain name. The application access control method according to the present disclosure further includes the following steps.

Step e1: in response to a domain name resolution request sent by the client, the domain name resolution request is forwarded to a central domain name system. The domain name resolution request is generated and sent to the client by the first business application based on the target application information and the target egress gateway information; and the central domain name system is configured to forward the domain name resolution request to the corresponding target egress gateway based on the target egress gateway information.

Step e2: a target network address and a gateway address of the target egress gateway that are fed back by the central domain name system are received. The target network address is obtained by the target egress gateway sending the domain name resolution request to a corresponding domain name resolution server for domain name resolution.

Step e3: the target network address and the gateway address are fed back to the client to cause the client to perform network address translation on the target network address to obtain a virtual network address, and data of the first business application is transmitted based on the virtual network address, the gateway address, and the target network address.

It should be noted that since a single domain name may resolve to a plurality of network addresses (the resolved network addresses being IP addresses), network addresses obtained based on resolution of the application domain name of the same business application may change. As a result, when the client of the security management application schedules access traffic of the same business application, it needs to dynamically adjust the routing, which can easily cause access errors. Based on this, in these embodiments, a network address translation (NAT) technology is used to perform network address translation on the target network address to obtain a virtual network address. This allows a single virtual network address to be used to represent all the resolved network addresses under the same application domain name, facilitating the scheduling of the access traffic of the same application domain name by the client of the security management application using the same virtual network address. In addition, for some application resources that require protection, converting an actual network address obtained through domain name resolution into a virtual network address can, to some extent, prevent an external network from directly learning about the actual network address of the domain name, thereby ensuring data security. Therefore, in step e3, when obtaining the target network address, the client of the security management application can select an unused preset network address as the virtual network address from a plurality of predefined preset network addresses or predefined network segments.

Figure 9:
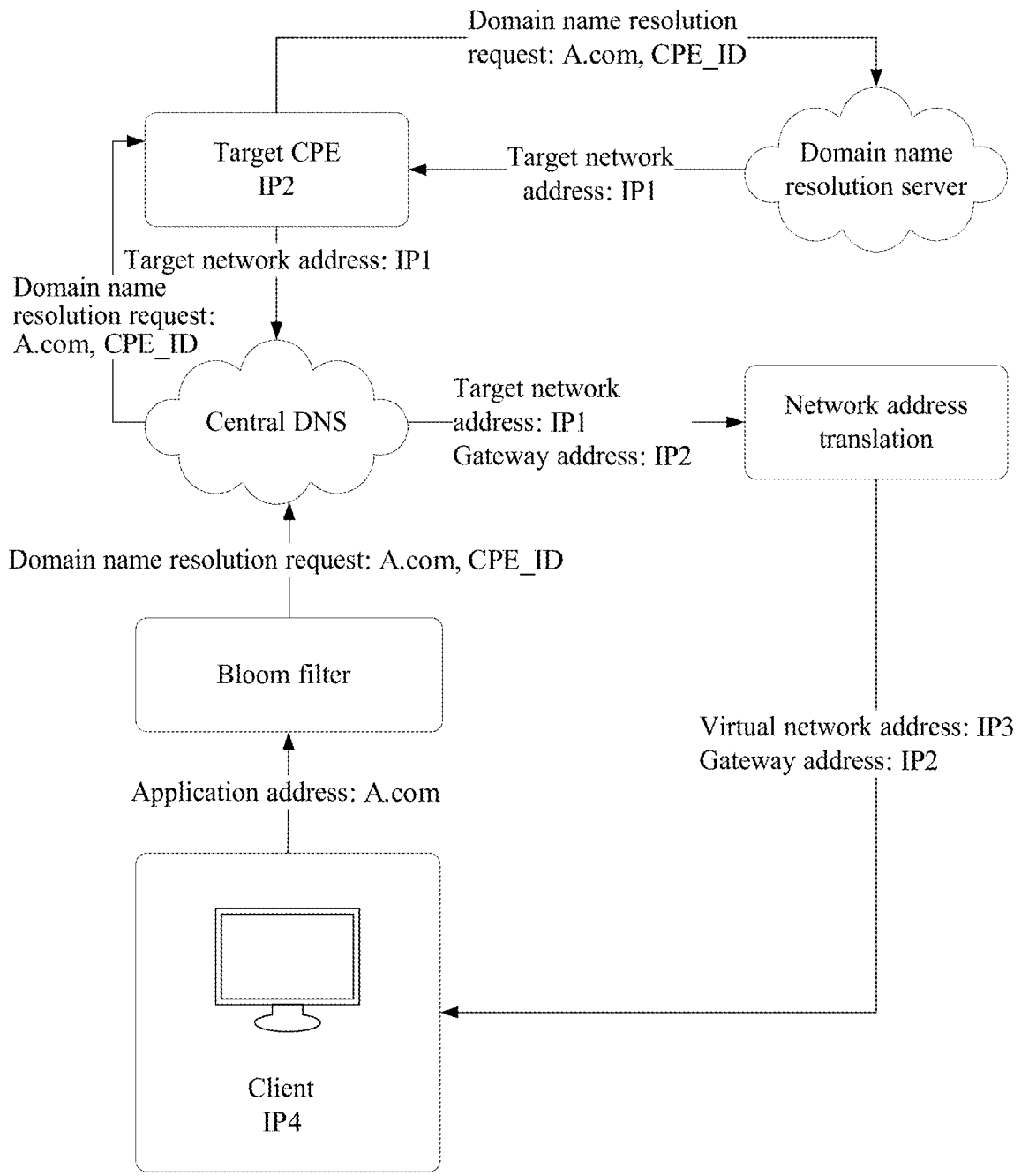
FIG. 9 is a schematic diagram of a domain name resolution process according to embodiments of the present disclosure.

As an example, as shown in FIG. 9, the target application information being the application information of the first business application that requires cross-region access to the service end, the target egress gateway being a target CPE in a region where the service end of the target application information is located, the target egress gateway information being identification information (i.e., CPE_ID shown in FIG. 9) of the target CPE, and the central domain name system being a central DNS for the SD-WAN is used as an example. After obtaining the target application information, the POP performs hash mapping on the target application information to obtain the Bloom filter representing the existence of the target application information, and feeds the Bloom filter and the target egress gateway information back to the client of the security management application.

Assuming that a business application A on the terminal device where the client of the security management application is located wants to access resources on the corresponding service end, the client obtains an application address (herein, the application address being a domain name), such as A.com, of the business application A. In this case, the client uses the Bloom filter to determine whether A.com matches any piece of target application information. If A.com matches any piece of target application information, it indicates that the business application A needs to access the corresponding service end across regions. The client then forwards A.com and CPE_ID to the central DNS through the corresponding POP (not shown in the figure). The central DNS sends A.com to the target CPE based on CPE_ID, and the target CPE sends A.com to the corresponding domain name resolution server for domain name resolution. Assuming that the resolved target network address corresponding to A.com is IP1 (i.e., the network address of the service end corresponding to A.com is IP1), the domain name resolution server feeds IP1 back to the target CPE, and the target CPE feeds IP1 back to the central DNS. The central DNS obtains a gateway address, such as IP2, of the target CPE. The central DNS feeds IP1 and IP2 back to the client of the security management application through the POP. The client performs network address translation on the target network address to obtain a virtual network address, such as IP3. Then, the client schedules the access traffic of A.com to the corresponding service end based on IP1, IP2, and IP3.

In addition, if a business application B on the terminal device where the client of the security management application is located wants to access resources on the corresponding service end, the client obtains a target domain name, such as B. com, of the business application B. If the client uses the Bloom filter to determine that B. com does not match the target application information fed back by the POP, it indicates that the business application B does not need to access the corresponding service end across regions. The client of the security management application then forwards, through a public network card. B.com to a domain name resolution server in the same region as the client or geographically closest to the client, thereby resolving a network address corresponding to B.com. The client schedules access traffic of the business application B to the service end corresponding to B.com based on the network address corresponding to B.com.

In some optional implementations, the application access control method of the present disclosure further includes the following steps.

Step f1: a second data request packet sent by the client is received. The second data request packet is obtained by the client replacing a destination address of a first data request packet with the gateway address and recording the target network address in the first data request packet. The first data request packet is obtained by the client determining, in response to a data request sent by the first business application and based on the data request, a data request packet to be transmitted and using the virtual network address as a destination address of the data request packet to be transmitted.

It should be noted that a source address of the first data request packet is the network address of the client of the security management application. The target network address is recorded in an options field of the first data request packet.

Step f2: the second data request packet is forwarded to the target egress gateway based on a destination address of the second data request packet. The target egress gateway is configured to replace, based on a target network address recorded in the second data request packet, the destination address of the second data request packet with the target network address, to send the second data request packet to a target service end corresponding to the target network address.

Step 13: a first response packet fed back by the target egress gateway is received. The first response packet is obtained by the target egress gateway replacing a source address of a response packet fed back by the target service end with the gateway address and recording the target network address in the response packet.

It should be noted that the source address of the response packet fed back by the target service end is the target network address, and the destination address thereof is the network address of the client of the security management application. The target network address is recorded in an options field of the first response packet.

Step f4: the first response packet is fed back to the client based on a destination address of the first response packet. The client is configured to replace, based on the target network address recorded in the first response packet, a source address of the first response packet with the target network address to obtain a second response packet; and the client is configured to replace a source address of the second response packet with the virtual network address to obtain a target response packet, and feed the target response packet back to the first business application.

It should be noted that the target response packet includes an application resource corresponding to the target application information.

It should be understood that in the above step f4, the client of the security management application first replaces the source address of the first response packet with the target network address to obtain the second response packet, and then replaces the source address of the second response packet with the virtual network address to obtain the target response packet. This is to ensure that a data transmission process in the present disclosure conforms to an access process of a standard hypertext transfer protocol (HTTP), making it clear for the client of the security management application that the received response packet is generated by the target service end rather than the target egress gateway, and that the currently received response packet is fed back based on the first data request packet with the virtual network address as the destination address. Therefore, it is ensured that a correct application resource is finally resolved.

Figure 10:
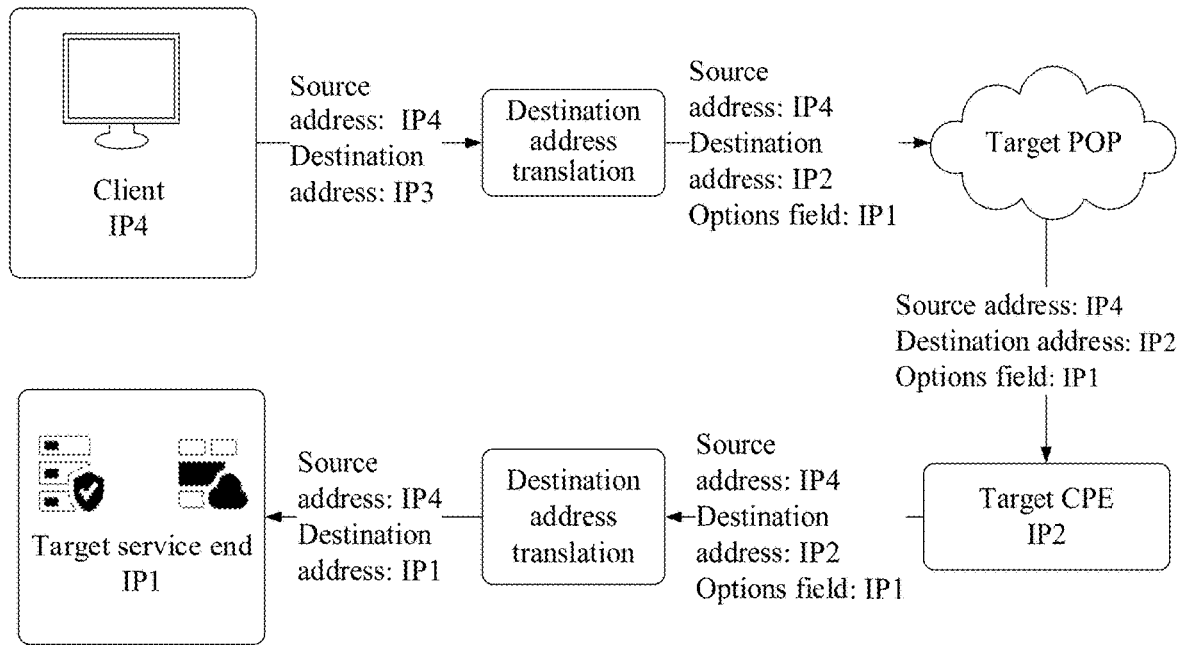
FIG. 10 is a schematic diagram of a transmission process of a data request packet according to embodiments of the present disclosure.

As an example, as shown in FIG. 10, the business application A on the terminal device where the client of the security management application is located requiring access to resources on the corresponding service end, the application address (herein, the application address being a domain name) of the business application A being A. com, the client obtaining IP1 as the target network address corresponding to A.com, IP2 as the gateway address of the target egress gateway, IP3 as the virtual network address corresponding to IP1, and IP4 as the network address of the client, the central domain name system being the central DNS for the SD-WAN, and the target egress gateway being the target CPE in the region where the service end for A.com is located is used as an example. The client of the security management application receives a data request from the business application A, determines a data request packet to be transmitted based on the data request, and generates a first data request packet with IP4 as a source address of the data request packet to be transmitted and IP3 as a destination address of the data request packet to be transmitted. The client performs destination address translation on the first data request packet, replaces the destination address of the first data request packet with IP2, and records IP1 in an options field of the first data request packet to obtain a second data request packet. The client sends the second data request packet to a corresponding target POP. The target POP includes a POP configured for data forwarding between the client of the security management application and the target CPE, and the target POP forwards the second data request packet to the target CPE. The target CPE performs destination address translation on the second data request packet based on IP1 recorded in the options field of the second data request packet, and replaces the destination address of the second data request packet with IP1 to obtain a third data request packet. The target egress gateway feeds the third data request packet back to the target service end corresponding to the target network address.

Figure 11:
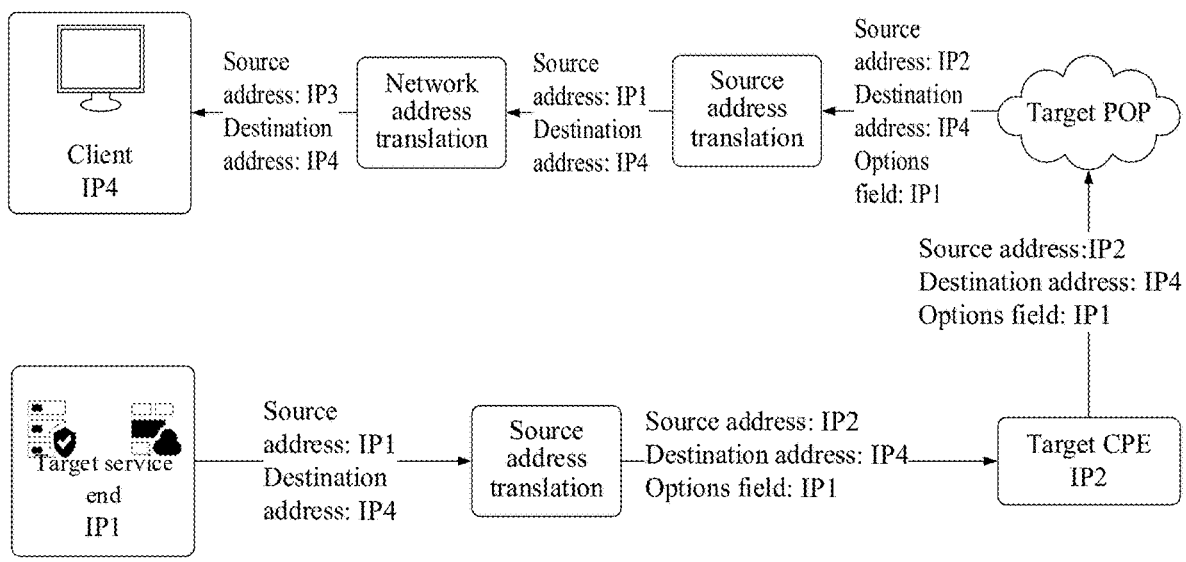
FIG. 11 is a schematic diagram of a transmission process of a response packet according to embodiments of the present disclosure.

Further, as shown in FIG. 11, the target service end generates a response packet with a source address of IP1 and a destination address of IP4 based on the third data request packet. The target service end feeds the generated response packet back to the target CPE, the target CPE replaces the source address of the response packet fed back by the target service end with IP2, and records IP1 in the options field of the response packet fed back by the target service end, to obtain a first response packet. The target CPE sends the first response packet to the target POP, and the target POP feeds the first response packet back to the client of the security management application. The client performs source address translation on the first response packet based on IP1 recorded in the options field of the first response packet and replaces the source address of the first response packet with IP1, to obtain a second response packet. Further, the client performs network address translation on the second response packet and replaces the source address of the second response packet with IP3 to obtain a target response packet. The client feeds the target response packet back to the business application A, such that the business application A obtains application resources relevant to A. com from the target response packet.

As a specific application example, an administrator of an enterprise can perform an application management configuration on the control plane, i.e., configure an application address to be scheduled, to obtain application information. Moreover, the enterprise administrator can perform a route-selection strategy configuration on the control plane, i.e. configure a correspondence between application information, access identifications, and egress gateway information, to obtain application configuration information. Then, the control plane delivers configured content to the POP of the SD-WAN. When an internal employee of the enterprise clicks to connect to the POP through the client of the security management application, the POP delivers the target application information and the target egress gateway information corresponding to the client of the security management application to the client of the security management application through the application access control method according to the present disclosure. When the business application on the terminal device where the client is located needs to access the application resource on the corresponding service end, the egress gateway information corresponding to the business application is determined through the target application information and the target egress gateway information that are delivered by the POP, thereby enabling access to the service end of the business application using the egress gateway corresponding to the egress gateway information, to obtain the application resource.

In these embodiments, an application access control apparatus is further provided. The apparatus is configured to implement the above embodiments and preferred implementations, which have already been described and are not repeated herein. As used below, the term "module" may be a combination of software and/or hardware that implements a predetermined function. Although the apparatus described in the following embodiments are preferably implemented in software, it is also possible and contemplated that the apparatus is implemented in hardware or a combination of software and hardware.

Figure 12:
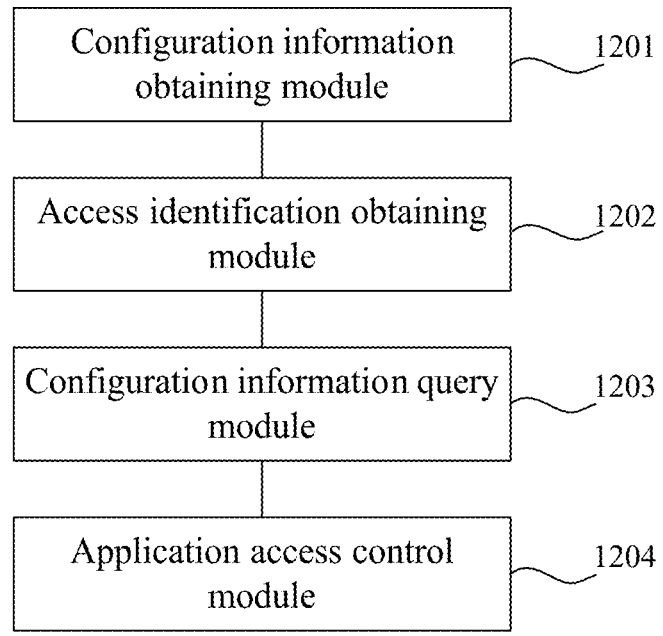
FIG. 12 is a block diagram of a structure of an application access control apparatus according to embodiments of the present disclosure.

These embodiments provide an application access control apparatus suitable for the SD-WAN, such as a POP of the SD-WAN. As shown in FIG. 12, the apparatus includes:
- a configuration information obtaining module 1201 configured to obtain application configuration information, where the application configuration information comprises a plurality of pieces of preset application information, and preset access identifications and egress gateway information corresponding to the pieces of preset application information;
- an access identification obtaining module 1202 configured to obtain, in response to a connection request from a client of a security management application, a target access identification of the client;
- a configuration information query module 1203 configured to query, based on the target access identification, corresponding target application information and target egress gateway information corresponding to the target application information from the application configuration information; and
- an application access control module 1204 configured to feed the target application information and the target egress gateway information back to the client, to cause the client to perform access control on a first business application on a target terminal device based on the target application information and the target egress gateway information, where the target terminal device is a terminal device where the client is located, and the first business application corresponds to the target application information.

In some optional implementations, the access identification obtaining module 1202 includes:
- a permission verification unit configured to send, in response to the connection request from the client, the connection request to a third-party authentication platform, to cause the third-party authentication platform to perform permission verification on the connection request; and
- an identification obtaining unit configured to receive, in response to the permission verification by the third-party authentication platform being successful, the target access identification fed back by the third-party authentication platform.

In some optional implementations, the application configuration information further includes priorities of the egress gateway information corresponding to the pieces of preset application information. The configuration information query module 1203 includes:
- a first information query unit configured to query, based on the target access identification, the corresponding target application information and a first gateway information set corresponding to the target application information from the application configuration information; and
- a second information query unit configured to determine, based on egress gateway information with a highest priority in the first gateway information set, the target egress gateway information adapted to the target application information.

In some optional implementations, the preset access identifications and the target access identification each include identifications of a plurality of categories. The first information query unit includes:
- an identification matching subunit configured to determine, from the preset access identifications and the target access identification, a first access identification and a second access identification that match each other, where the first access identification belongs to the preset access identifications, and the second access identification belongs to the target access identification;
- an application determination subunit configured to determine preset application information corresponding to the first access identification as target application information adapted to the second access identification; and
- a gateway determination subunit configured to determine, based on egress gateway information corresponding to the first access identification, the first gateway information set adapted to the target application information.

In some optional implementations, the gateway determination subunit is specifically configured to:
- obtain, in a case where there are a plurality of pieces of egress gateway information with the highest priority, a second gateway information set based on the egress gateway information with the highest priority in the first gateway information set;

obtain configuration times of the pieces of egress gateway information in the second gateway information set; and determine egress gateway information with a most recent configuration time in the second gateway information set as the target egress gateway information.

In some optional implementations, the application access control module 1204 includes:

a data mapping unit configured to perform hash mapping on the target application information to obtain target mapping data, where the target mapping data is used to represent existence of the target application information; and a data feedback unit configured to feed the target mapping data and the target egress gateway information back to the client.

In some optional implementations, the application access control apparatus according to the present disclosure further includes:

an application information parsing module configured to parse, in response to an application query request from the client, the application query request to obtain application information to be queried, where the application query request is generated by the client based on application information of a second business application on the target terminal device in response to detecting that the application information of the second business application does not exist in the target application information;

a route-selection information obtaining module configured to obtain branch route-selection information, where the branch route-selection information comprises branch routing information corresponding to the plurality of pieces of preset application information;

a routing information query module configured to query corresponding target branch routing information from the branch route-selection information based on the application information to be queried; and a routing information feedback module configured to feed the target branch routing information back to the client, to cause the client to perform access control on the second business application based on the target branch routing information.

In some optional implementations, the branch route-selection information further includes a priority of each piece of branch routing information. The routing information query module includes:

a routing set query unit configured to query a corresponding branch routing information set from the branch route-selection information based on the application information to be queried; and a routing information determination unit configured to determine branch routing information with the highest priority in the branch routing information set as the target branch routing information.

In some optional implementations, the target application information includes a domain name of the first business application. The application access control apparatus according to the present disclosure further includes:

a resolution request response module configured to forward, in response to a domain name resolution request sent by the client, the domain name resolution request to a central domain name system, where the domain name resolution request is generated and sent to the client by the first business application based on the target application information and the target egress gateway information; and the central domain name system is configured to forward the domain name resolution request to a corresponding target egress gateway based on the target egress gateway information;

a resolution result receiving module configured to receive a target network address and a gateway address of the target egress gateway that are fed back by the central domain name system, where the target network address is obtained by the target egress gateway sending the domain name resolution request to a corresponding domain name resolution server for domain name resolution; and a resolution result feedback module configured to feed the target network address and the gateway address back to the client, to cause the client to perform network address translation on the target network address to obtain a virtual network address, and transmitting data of the first business application based on the virtual network address, the gateway address, and the target network address.

In some optional implementations, the application access control apparatus according to the present disclosure further includes:

a data packet receiving module configured to receive a second data request packet sent by the client, where the second data request packet is obtained by the client replacing a destination address of a first data request packet with the gateway address and recording the target network address in the first data request packet, where the first data request packet is obtained by the client determining, in response to a data request sent by the first business application and based on the data request, a data request packet to be transmitted, and using the virtual network address as a destination address of the data request packet to be transmitted;

a data packet forwarding module configured to forward the second data request packet to the target egress gateway based on a destination address of the second data request packet, where the target egress gateway is configured to replace, based on a target network address recorded in the second data request packet, the destination address of the second data request packet with the target network address, to send the second data request packet to a target service end corresponding to the target network address;

a response packet receiving module configured to receive a first response packet fed back by the target egress gateway, where the first response packet is obtained by the target egress gateway replacing a source address of a response packet fed back by the target service end with the gateway address, and recording the target network address in the response packet; and a response packet feedback module configured to feed the first response packet back to the client based on a destination address of the first response packet, where the client is configured to replace, based on the target network address recorded in the first response packet, a source address of the first response packet with the target network address to obtain a second response packet; and the client is configured to replace a source address of the second response packet with the virtual network address to obtain a target response packet, and feed the target response packet back to the first business application.

Further functional descriptions of the above modules and units are the same as those in the above corresponding embodiments. Details are not described herein again.

The application access control apparatus in these embodiments is presented in the form of a functional unit. The unit herein refers to an application specific integrated circuit (ASIC), a processor and a memory that execute one or more software programs or fixed programs, and/or another device that may provide the above functions.

Embodiments of the present disclosure further provide a computer device having the application access control apparatus as shown in FIG. 12 above.

Figure 13:
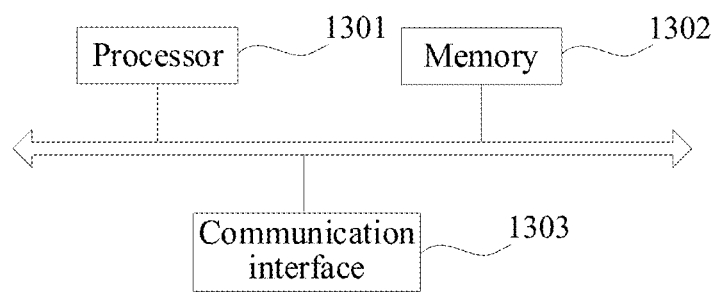
FIG. 13 is a block diagram of a structure of a computer device according to embodiments of the present disclosure.

Referring to FIG. 13, FIG. 13 is a block diagram of a structure of a computer device according to optional embodiments of the present disclosure. As shown in FIG. 13, the computer device includes: one or more processors 1301, a memory 1302, and interfaces for connecting components, including a high-speed interface and a low-speed interface. The components are communicatively connected to each other via different buses, and can be mounted on a common motherboard or otherwise as desired. The processor may process instructions executed in the computer device, including instructions stored in or on the memory to display graphical information of a graphical user interface (GUI) on an external input/output apparatus (e.g., a display device coupled to the interface). In some optional implementations, if required, a plurality of processors and/or a plurality of buses may be used together with a plurality of memories and a plurality of memories. Likewise, a plurality of computer devices may be connected, each providing some of necessary operations (e.g., as a server array, a set of blade servers, or a multi-processor system). One processor 1301 is used as an example in FIG. 13.

The processor 1301 may be a central processor, a network processor, or a combination thereof. The processor 1301 may further include a hardware chip. The hardware chip may be an application-specific integrated circuit, a programmable logic device, or a combination thereof. The programmable logic device may be a complex programmable logic device, a field-programmable gate array, a generic array logic, or any combination thereof.

The memory 1302 stores instructions executable by at least one processor 1301, to cause the at least one processor 1301 to perform and implement the method shown in the above embodiments.

The memory 1302 may include a program storage area and a data storage area. The program storage area may store an operating system, and an application required by at least one function. The data storage area may store data created based on use of the computer device, etc. In addition, the memory 1302 may include a high-speed random access memory, and may further include a non-transitory memory, such as at least one magnetic disk storage device, a flash memory device, or other non-transitory solid-state storage devices. In some optional implementations, the memory 1302 optionally includes memories remotely disposed relative to the processor 1301. The remote memories may be connected to the computer device through a network. Instances of the network include, but are not limited to, the Internet, intranets, local area networks, mobile communication networks, and combinations thereof.

The memory 1302 may include a volatile memory, such as a random access memory. The memory may also include a non-volatile memory, such as a flash memory, a hard disk drive, or a solid-state hard disk. The memory 1302 may also include a combination of the above types of memories.

The computer device further includes a communication interface 1303 for the computer device to communicate with other devices or communication networks.

Embodiments of the present disclosure further provide a computer-readable storage medium. The above method according to embodiments of the present disclosure may be implemented in hardware or firmware, or implemented as computer code that may be recorded on a storage medium, or implemented as computer code that is originally stored on a remote storage medium or a non-transitory machine-readable storage medium downloaded over a network and that is to be stored on a local storage medium, so that the method described herein may be processed by such software stored on a storage medium using a general-purpose computer, a special-purpose processor, or programmable or special-purpose hardware. The storage medium may be a magnetic disk, an optical disc, a read-only storage memory, a random storage memory, a flash memory, a hard disk drive or a solid-state drive, etc. Further, the storage medium may also include a combination of the above types of memories. It can be understood that a computer, a processor, a microprocessor controller, or programmable hardware includes a storage component that can store or receive software or computer code. When the software or computer code is accessed and executed by the computer, the processor, or the hardware, the methods shown in the above embodiments are implemented.

Part of the present disclosure may be applied as a computer program product, such as computer program instructions that, when executed by a computer, can invoke or provide the method and/or the technical solution according to the present disclosure through operations of the computer. Those skilled in the art should understand that the existence forms of the computer program instructions in the computer-readable media include but are not limited to source files, executable files, installation package files, etc. Accordingly, the manners in which the computer program instructions are executed by the computer include but is not limited to: the computer directly executing the instructions, or the computer compiling the instructions and then executing corresponding compiled programs, or the computer reading and executing the instructions, or the computer reading and installing the instructions and then executing corresponding installed programs. Herein, the computer-readable medium may be any available computer-readable storage medium or communication medium that can be accessed by the computer.

Although the embodiments of the present disclosure are described with reference to the accompanying drawings, those skilled in the art would provide various modifications and variations without departing from the spirit and scope of the present disclosure, and such modifications and variations shall all fall within the scope defined by the appended claims.

We claim:

1. An application access control method applied to software defined networking in a wide area network, the method comprising:

obtaining application configuration information, wherein the application configuration information comprises a plurality of pieces of preset application information, and preset access identifications and egress gateway information corresponding to the pieces of preset application information;

obtaining, in response to a connection request from a client of a security management application, a target access identification of the client;

querying, based on the target access identification, corresponding target application information and target egress gateway information corresponding to the target application information from the application configuration information; and feeding the target application information and the target egress gateway information back to the client, to cause the client to perform access control on a first business application on a target terminal device based on the target application information and the target egress gateway information, wherein the target terminal device is a terminal device where the client is located, and the first business application corresponds to the target application information, wherein the application configuration information further comprises priorities of the egress gateway information corresponding to the pieces of preset application information; and querying, based on the target access identification, the corresponding target application information and the target egress gateway information corresponding to the target application information from the application configuration information comprises:

querying, based on the target access identification, the corresponding target application information and a first gateway information set corresponding to the target application information from the application configuration information; and determining, based on egress gateway information with a highest priority in the first gateway information set, the target egress gateway information adapted to the target application information.

2. The application access control method according to claim 1, wherein both the preset access identifications and the target access identification comprise identifications of a plurality of categories; and querying, based on the target access identification, the corresponding target application information and the first gateway information set corresponding to the target application information from the application configuration information comprises:

determining, from the preset access identifications and the target access identification, a first access identification and a second access identification that match each other, wherein the first access identification belongs to the preset access identifications, and the second access identification belongs to the target access identification;

determining preset application information corresponding to the first access identification as target application information adapted to the second access identification; and determining, based on egress gateway information corresponding to the first access identification, the first gateway information set adapted to the target application information.

3. The application access control method according to claim 1, wherein in a case where there are a plurality of pieces of egress gateway information with the highest priority existing, determining, based on the egress gateway information with the highest priority in the first gateway information set, the target egress gateway information adapted to the target application information comprises:

obtaining a second gateway information set based on the egress gateway information with the highest priority in the first gateway information set;

obtaining configuration times of the pieces of egress gateway information in the second gateway information set; and determining egress gateway information with a most recent configuration time in the second gateway information set as the target egress gateway information.

4. The application access control method according to claim 1, wherein feeding the target application information and the target egress gateway information back to the client comprises:

performing hash mapping on the target application information to obtain target mapping data, wherein the target mapping data is used to represent existence of the target application information; and feeding the target mapping data and the target egress gateway information back to the client.

5. The application access control method according to claim 1, wherein the method further comprises:

parsing, in response to an application query request from the client, the application query request to obtain application information to be queried, wherein the application query request is generated by the client based on application information of a second business application on the target terminal device in response to detecting that the application information of the second business application does not exist in the target application information;

obtaining branch route-selection information, wherein the branch route-selection information comprises branch routing information corresponding to the plurality of pieces of preset application information;

querying corresponding target branch routing information from the branch route-selection information based on the application information to be queried; and feeding the target branch routing information back to the client, to cause the client to perform access control on the second business application based on the target branch routing information.

6. The application access control method according to claim 5, wherein the branch route-selection information further comprises a priority of each piece of branch routing information; and querying the corresponding target branch routing information from the branch route-selection information based on the application information to be queried comprises:

querying a corresponding branch routing information set from the branch route-selection information based on the application information to be queried; and determining branch routing information with the highest priority in the branch routing information set as the target branch routing information.

7. The application access control method according to claim 1, wherein obtaining, in response to the connection request from the client, the target access identification of the client comprises:

sending, in response to the connection request from the client, the connection request to a third-party authentication platform, to cause the third-party authentication platform to perform permission verification on the connection request; and receiving, in response to the permission verification by the third-party authentication platform being successful, the target access identification fed back by the third-party authentication platform.

8. The application access control method according to claim 1, wherein the target application information comprises a domain name of the first business application; and the method further comprises:

forwarding, in response to a domain name resolution request sent by the client, the domain name resolution request to a central domain name system, wherein the domain name resolution request is generated and sent to the client by the first business application based on the target application information and the target egress gateway information; and the central domain name system is configured to forward the domain name resolution request to a corresponding target egress gateway based on the target egress gateway information;

receiving a target network address and a gateway address of the target egress gateway that are fed back by the central domain name system, wherein the target network address is obtained by the target egress gateway sending the domain name resolution request to a corresponding domain name resolution server for domain name resolution; and feeding the target network address and the gateway address back to the client, to cause the client to perform network address translation on the target network address to obtain a virtual network address, and transmitting data of the first business application based on the virtual network address, the gateway address, and the target network address.

9. The application access control method according to claim 8, wherein the method further comprises:

receiving a second data request packet sent by the client, wherein the second data request packet is obtained by the client replacing a destination address of a first data request packet with the gateway address and recording the target network address in the first data request packet, wherein the first data request packet is obtained by the client determining, in response to a data request sent by the first business application and based on the data request, a data request packet to be transmitted, and using the virtual network address as a destination address of the data request packet to be transmitted;

forwarding the second data request packet to the target egress gateway based on a destination address of the second data request packet, wherein the target egress gateway is configured to replace, based on a target network address recorded in the second data request packet, the destination address of the second data request packet with the target network address, to send the second data request packet to a target service end corresponding to the target network address;

receiving a first response packet fed back by the target egress gateway, wherein the first response packet is obtained by the target egress gateway replacing a source address of a response packet fed back by the target service end with the gateway address, and recording the target network address in the response packet; and feeding the first response packet back to the client based on a destination address of the first response packet, wherein the client is configured to replace, based on the target network address recorded in the first response packet, a source address of the first response packet with the target network address to obtain a second response packet; and the client is configured to replace a source address of the second response packet with the virtual network address to obtain a target response packet, and feed the target response packet back to the first business application.

10. A computer device, comprising:
a memory and a processor communicatively connected to each other, wherein the memory stores computer instructions, and the computer instructions, when executed by the processor, cause the computer device to:

obtain application configuration information, wherein the application configuration information comprises a plurality of pieces of preset application information, and preset access identifications and egress gateway information corresponding to the pieces of preset application information;

obtain, in response to a connection request from a client of a security management application, a target access identification of the client;

query, based on the target access identification, corresponding target application information and target egress gateway information corresponding to the target application information from the application configuration information; and feed the target application information and the target egress gateway information back to the client, to cause the client to perform access control on a first business application on a target terminal device based on the target application information and the target egress gateway information, wherein the target terminal device is a terminal device where the client is located, and the first business application corresponds to the target application information, wherein the application configuration information further comprises priorities of the egress gateway information corresponding to the pieces of preset application information; and the computer instructions causing the computer device to query, based on the target access identification, the corresponding target application information and the target egress gateway information corresponding to the target application information from the application configuration information comprise computer instructions causing the computer device to:

query, based on the target access identification, the corresponding target application information and a first gateway information set corresponding to the target application information from the application configuration information; and determine, based on egress gateway information with a highest priority in the first gateway information set, the target egress gateway information adapted to the target application information.

11. The computer device according to claim 10, wherein both the preset access identifications and the target access identification comprise identifications of a plurality of categories; and the computer instructions causing the computer device to query, based on the target access identification, the corresponding target application information and the first gateway information set corresponding to the target application information from the application configuration information comprise computer instructions causing the computer device to:

determine, from the preset access identifications and the target access identification, a first access identification and a second access identification that match each other, wherein the first access identification belongs to the preset access identifications, and the second access identification belongs to the target access identification;

determine preset application information corresponding to the first access identification as target application information adapted to the second access identification; and determine, based on egress gateway information corresponding to the first access identification, the first gateway information set adapted to the target application information.

12. The computer device according to claim 10, wherein the computer instructions causing the computer device to determine, based on the egress gateway information with the highest priority in the first gateway information set, the target egress gateway information adapted to the target application information comprise computer instructions causing the computer device to, in a case where there are a plurality of pieces of egress gateway information with the highest priority existing:
   obtain a second gateway information set based on the egress gateway information with the highest priority in the first gateway information set;
   obtain configuration times of the pieces of egress gateway information in the second gateway information set; and
   determine egress gateway information with a most recent configuration time in the second gateway information set as the target egress gateway information.

13. The computer device according to claim 10, wherein the computer instructions causing the computer device to feed the target application information and the target egress gateway information back to the client comprise computer instructions causing the computer device to:
   perform hash mapping on the target application information to obtain target mapping data, wherein the target mapping data is used to represent existence of the target application information; and
   feed the target mapping data and the target egress gateway information back to the client.

14. The computer device according to claim 10, wherein the computer instructions further cause the computer device to:
   parse, in response to an application query request from the client, the application query request to obtain application information to be queried, wherein the application query request is generated by the client based on application information of a second business application on the target terminal device in response to detecting that the application information of the second business application does not exist in the target application information;
   obtain branch route-selection information, wherein the branch route-selection information comprises branch routing information corresponding to the plurality of pieces of preset application information;
   query corresponding target branch routing information from the branch route-selection information based on the application information to be queried; and
   feed the target branch routing information back to the client, to cause the client to perform access control on the second business application based on the target branch routing information.

15. The computer device according to claim 14, wherein the branch route-selection information further comprises a priority of each piece of branch routing information; and the computer instructions causing the computer device to query the corresponding target branch routing information from the branch route-selection information based on the application information to be queried comprise computer instructions causing the computer device to:
   query a corresponding branch routing information set from the branch route-selection information based on the application information to be queried; and
   determine branch routing information with the highest priority in the branch routing information set as the target branch routing information.

16. The computer device according to claim 10, wherein the computer instructions causing the computer device to obtain, in response to the connection request from the client, the target access identification of the client comprise computer instructions causing the computer device to:
   send, in response to the connection request from the client, the connection request to a third-party authentication platform, to cause the third-party authentication platform to perform permission verification on the connection request; and
   receive, in response to the permission verification by the third-party authentication platform being successful, the target access identification fed back by the third-party authentication platform.

17. The computer device according to claim 10, wherein the target application information comprises a domain name of the first business application; and the computer instructions further cause the computer device to:
   forward, in response to a domain name resolution request sent by the client, the domain name resolution request to a central domain name system, wherein the domain name resolution request is generated and sent to the client by the first business application based on the target application information and the target egress gateway information; and the central domain name system is configured to forward the domain name resolution request to a corresponding target egress gateway based on the target egress gateway information;
   receive a target network address and a gateway address of the target egress gateway that are fed back by the central domain name system, wherein the target network address is obtained by the target egress gateway sending the domain name resolution request to a corresponding domain name resolution server for domain name resolution; and
   feed the target network address and the gateway address back to the client, to cause the client to perform network address translation on the target network address to obtain a virtual network address, and transmitting data of the first business application based on the virtual network address, the gateway address, and the target network address.

18. A non-transitory computer-readable storage medium storing computer instructions, wherein the computer instructions, when executed by a processor, cause a computer to:
   obtain application configuration information, wherein the application configuration information comprises a plurality of pieces of preset application information, and preset access identifications and egress gateway information corresponding to the pieces of preset application information, wherein the preset access identifications comprise one or more of a user identification, a department identification, and a role identification, and the egress gateway information is used to determine a customer premises equipment as an egress gateway that is geographically close to a service end of a business application corresponding to the preset application information;
   obtain, in response to a connection request from a client of a security management application, a target access identification of the client;
   query, based on the target access identification, corresponding target application information and target egress gateway information corresponding to the target application information from the application configuration information; and feed the target application information and the target egress gateway information back to the client, to cause the client to perform access control on a first business application on a target terminal device based on the target application information and the target egress gateway information, wherein the target terminal device is a terminal device where the client is located, and the first business application corresponds to the target application information, wherein the application configuration information further comprises priorities of the egress gateway information corresponding to the pieces of preset application information; and the computer instructions causing the computer to query, based on the target access identification, the corresponding target application information and the target egress gateway information corresponding to the target application information from the application configuration information comprise computer instructions causing the computer to:

query, based on the target access identification, the corresponding target application information and a first gateway information set corresponding to the target application information from the application configuration information; and determine, based on egress gateway information with a highest priority in the first gateway information set, the target egress gateway information adapted to the target application information.

\* \* \* \* \*